(12) United States Patent
Iiyama

(10) Patent No.: US 11,184,501 B2
(45) Date of Patent: Nov. 23, 2021

(54) READING DEVICE

(71) Applicant: Panasonic Intellectual Property Management Co., Ltd., Osaka (JP)

(72) Inventor: Tomoko Iiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/038,299

(22) Filed: Sep. 30, 2020

(65) Prior Publication Data
US 2021/0014377 A1    Jan. 14, 2021

Related U.S. Application Data

(63) Continuation of application No. PCT/JP2019/010914, filed on Mar. 15, 2019.

(30) Foreign Application Priority Data

Apr. 2, 2018   (JP) .............................. JP2018-071155

(51) Int. Cl.
*H04N 1/04* (2006.01)
*H04N 1/028* (2006.01)
*H04N 1/00* (2006.01)

(52) U.S. Cl.
CPC ....... *H04N 1/0289* (2013.01); *H04N 1/00559* (2013.01); *H04N 1/00997* (2013.01)

(58) Field of Classification Search
CPC ............. H04N 1/0289; H04N 1/00559; H04N 1/00997

(Continued)

(56) References Cited

U.S. PATENT DOCUMENTS 5,842,060 A * 11/1998 White ............... H05K 13/0812
   396/155
7,808,681 B2 * 10/2010 Hatzav ............... G03G 15/5025
   358/474

(Continued)

FOREIGN PATENT DOCUMENTS

EP   2 323 369           5/2011
JP   60118829 A   *   6/1985
(Continued)

OTHER PUBLICATIONS

International Search Report dated Apr. 23, 2019 in International (PCT) Application No. PCT/JP2019/010914 with English translation.

(Continued)

*Primary Examiner* — Cheukfan Lee
(74) *Attorney, Agent, or Firm* — Wenderoth, Lind & Ponack, L.L.P.

(57) ABSTRACT

The reading device of the present disclosure includes a housing, a first irradiation part, an imaging device, and a first diffusion part. The housing has an opening in an upper portion with a transparent reading window member. The first irradiation part emits an infrared light. The imaging device is disposed on a bottom portion such that an optical axis is directed to a reading window member. The first diffusion part is disposed on a left side wall connecting the upper and bottom portions. The first diffusion part diffuses the infrared light. The first diffusion part is made up of a light-transmitting first diffusion plate and a light-transmitting second diffusion plate. The first diffusion plate is disposed on the bottom surface side and inclined toward the upper portion. The second diffusion plate is disposed on the upper surface side and inclined toward the bottom portion.

11 Claims, 11 Drawing Sheets

(58) Field of Classification Search
USPC .......................................... 358/475, 474, 509
See application file for complete search history.

(56) References Cited

U.S. PATENT DOCUMENTS

| | | | | |
|---|---|---|---|---|
| 7,843,611 B2* | 11/2010 | Albahri | ............ | H04N 1/19594 |
| | | | | 358/474 |
| 7,948,665 B2* | 5/2011 | Hatzav | ................ | G03B 27/323 |
| | | | | 358/475 |
| 8,920,001 B2* | 12/2014 | Park | ..................... | F21V 7/0016 |
| | | | | 362/307 |
| 2005/0238222 A1* | 10/2005 | Nakano | ............ | H05K 13/0812 |
| | | | | 382/151 |
| 2006/0072822 A1* | 4/2006 | Hatzav | ................ | G03B 27/323 |
| | | | | 382/181 |
| 2008/0024836 A1* | 1/2008 | Sundnes | ................ | H04N 1/10 |
| | | | | 358/474 |
| 2011/0297819 A1 | 12/2011 | Mukawa et al. | | |
| 2012/0014106 A1* | 1/2012 | Kamijima | ........... | H01S 5/02257 |
| | | | | 362/293 |
| 2012/0113483 A1 | 5/2012 | Mukawa et al. | | |
| 2013/0021653 A1* | 1/2013 | Hatzav | ............... | H04N 1/19594 |
| | | | | 358/474 |
| 2017/0147876 A1* | 5/2017 | Hagelin | ............... | G06K 9/2018 |
| 2021/0191005 A1* | 6/2021 | Fancsali | ............... | G02B 5/0278 |

FOREIGN PATENT DOCUMENTS

| | | |
|---|---|---|
| JP | 3077577 | 5/2001 |
| JP | 4473930 | 6/2010 |
| JP | 4473933 | 6/2010 |
| JP | 2010-200187 | 9/2010 |

OTHER PUBLICATIONS

Extended European Search Report dated Apr. 15, 2021, issued in European Patent Application No. 19781000.5.
English Translation of International Preliminary Report on Patentability dated Oct. 6, 2020 in International (PCT) Application No. PCT/JP2019/010914.

* cited by examiner

READING DEVICE

CROSS-REFERENCE TO RELATED APPLICATIONS

This is a continuation application of International Application No. PCT/JP2019/010914, with an international filing date of Mar. 15, 2019, which claims priority of Japanese Patent Application No. 2018-071155 filed on Apr. 2, 2018, the content of which is incorporated herein by reference.

BACKGROUND OF THE INVENTION

1. Technical Field

The present invention relates to a reading device imaging and reading a reading object.

2. Description of Related Art

JP 4473933 B1 discloses a reading device including a mounting surface on which a surface to be read of a reading object such as a passport is placed, an illumination light source including an infrared light source or a visible light source illuminating the surface to be read, an imaging part imaging the surface to be read, and a mirror changing an optical path from the surface to be read and focusing a light on the imaging part. The illumination light source is locally disposed close to the mounting surface, so that the reading device acquires an image with less illumination unevenness.

SUMMARY

The present disclosure provides a reading device reducing illumination unevenness to improve reading accuracy.

The reading device of the present disclosure includes a housing, a first irradiation part, an imaging device, and a first diffusion part. The housing has an opening in an upper portion with a transparent reading window member disposed therein. The first irradiation part emits an infrared light. The imaging device is disposed on a bottom portion facing the upper portion inside the housing such that an optical axis is directed to a reading window member. The first diffusion part is disposed on a left side wall connecting the upper portion and the bottom portion inside the housing. The first diffusion part diffuses the infrared light from the first irradiation part. The first diffusion part is made up of a light-transmitting first diffusion plate and a light-transmitting second diffusion plate. The first diffusion plate is disposed on the bottom surface side of the left side wall and inclined toward the upper portion. The second diffusion plate is disposed on the upper surface side of the left side wall and inclined toward the bottom portion.

The present disclosure can provide the reading device reducing illumination unevenness to improve reading accuracy.

DETAILED EMBODIMENTS

Embodiments will now be described in detail with reference to the drawings as needed. It is noted that detailed description will not be provided more than necessary in some cases. For example, detailed description of already well-known facts and repeated description of substantially the same constituent elements may not be provided. This is for the purpose of avoiding unnecessary redundancy of the following description and facilitating understanding by those skilled in the art.

The accompanying drawings and the following description are provided by the present inventor(s) for sufficient understanding of the present disclosure by those skilled in the art, and it is not intended to limit the subject matter described in claims thereto.

First Embodiment

1. Configuration

Figure 1:
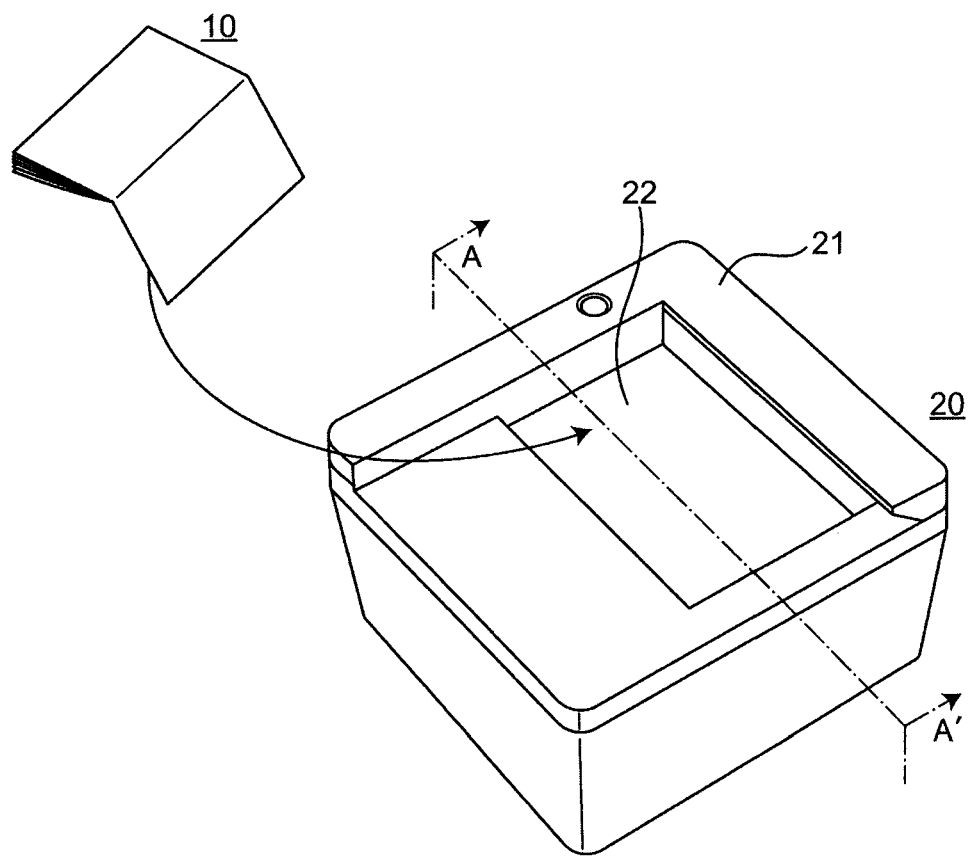
FIG. 1 is a perspective view showing an appearance of a reading device according to a first embodiment of the present disclosure.

FIG. 1 is a perspective view showing an appearance of a reading device 20 according to a first embodiment. The reading device 20 includes a housing 21 having an opening in an upper portion (first surface) and a reading window member 22 fitted in the opening.

The housing 21 houses various members described later. A surface to be read of a reading object 10 is placed on an upper surface of the reading window member 22. The reading window member 22 is made of light transmissive glass or resin such as organic glass. An antireflection sheet, an antireflection film, an anti-scattering sheet, etc. may be affixed to the surface of the reading window member 22. The reading device 20 includes an imaging device therein, and the imaging device images the surface to be read through the reading window member 22.

Figure 2:
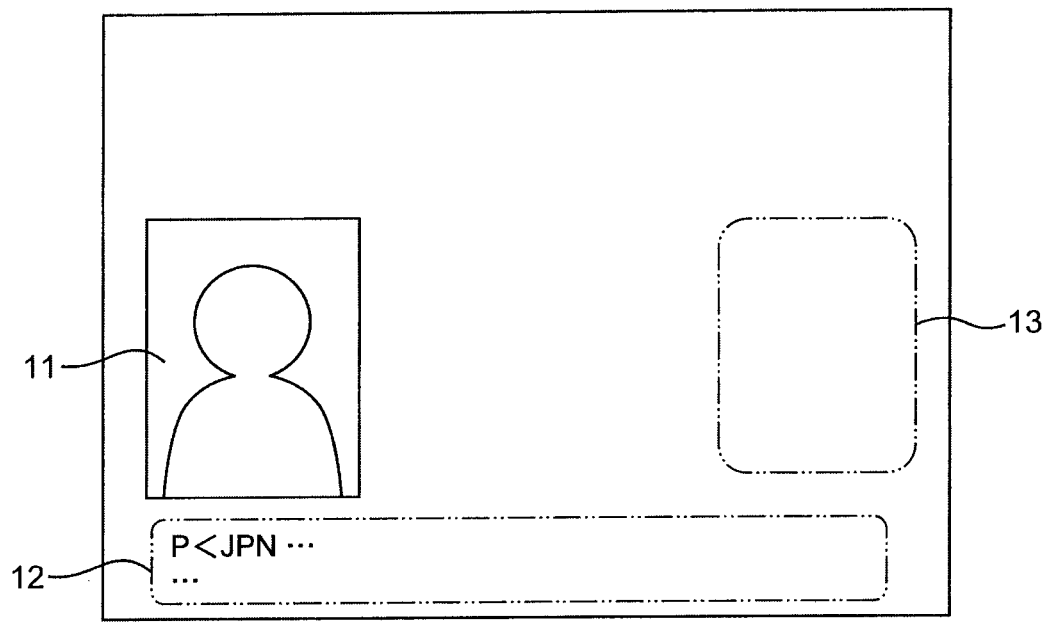
FIG. 2 is a view showing an example of a surface to be read of a reading object.

FIG. 2 is a view showing an example of the surface to be read of the reading object 10. The reading object 10 is a passport, for example. A face photograph 11, passport data 12, and a FIG. 13 for forgery prevention, etc. are arranged on the surface to be read. The FIG. 13 for forgery prevention is printed by using a paint reacting with ultraviolet rays to fluoresce. The reading device 20 optically reads information such as the face photograph 11, the passport data 12, and the FIG. 13 from the surface to be read of the reading object 10.

Figure 3:
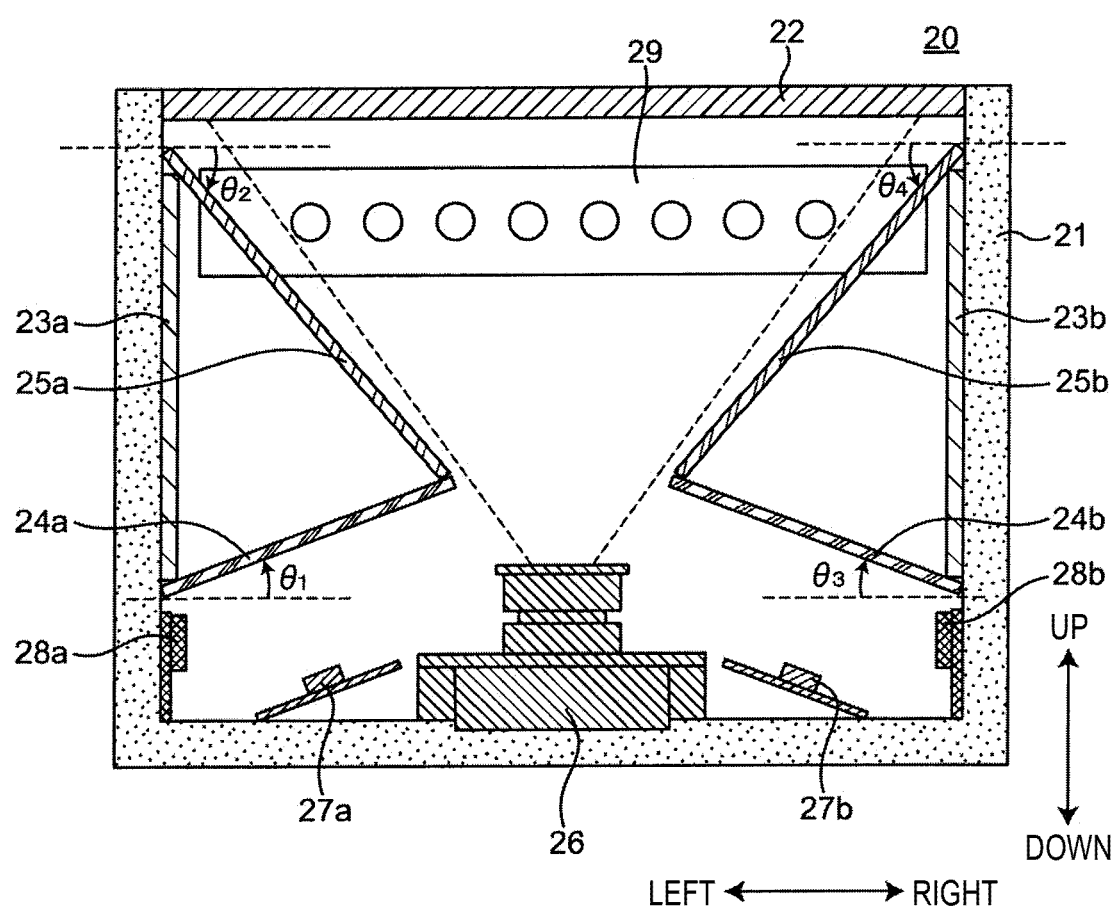
FIG. 3 is a cross-sectional view showing the configuration of the reading device.

FIG. 3 is a cross-sectional view showing a configuration of the reading device 20 corresponding to a cross section taken along A-A' of FIG. 1. As described above, the reading device 20 includes the housing 21 and the reading window member 22. The reading device 20 includes first irradiation parts 27a, 27b emitting an infrared light and second irradiation parts 28a, 28b emitting a visible light. The reading device 20 includes an imaging device 26 and a third irradiation part 29 emitting an ultraviolet light. The reading device 20 includes a first diffusion part and a second diffusion part. The first diffusion part is made up of a light-transmitting first diffusion plate 24a and a light-transmitting second diffusion plate 25a. The second diffusion part includes a light-transmitting third diffusion plate 24b and a light-transmitting fourth diffusion plate 25b. The reading device 20 includes light-diffusing reflection plates 23a, 23b.

The first diffusion part and the second diffusion part transmit and diffuse an incident light. As used herein, "transmit and diffuse" means that light transmitted through an object spreads and scatters at various angles due to fine irregularities of the object. The first diffusion part and the second diffusion part are made of glass or organic glass such as acrylic.

The light-diffusing reflection plates 23a, 23b diffusely reflect the incident light. As used herein, "diffusely reflect" means that light incident on an object is reflected at various angles due to fine irregularities of the object. The reflection plates 23a, 23b of this embodiment are made up of white plates containing a white material having high diffusivity; however, the present invention is not limited thereto. The reflection plates 23a, 23b may be made up of, for example, a reflection plate made of aluminum etc. to which white paint with high diffuse reflectivity is applied, a reflection sheet, or a white glass or resin plate material having high diffuse reflectivity. Although the reflection plates 23a, 23b of this embodiment are arranged on a side wall inside the housing 21, the reflection plates may be formed integrally with the housing 21. Alternatively, an entire side wall of the housing 21 may be formed as a reflection plate.

The first irradiation parts 27a, 27b include a substrate and multiple infrared light sources mounted on the substrate. The infrared light sources emit an infrared light. A circuit driving the infrared light sources is disposed on the substrate. The first irradiation parts 27a, 27b emit near infrared rays having a wavelength of 0.7 to 2.5 µm, for example. The first irradiation parts 27a, 27b each include six infrared light LEDs as infrared light sources. The six infrared light LEDs are arranged in a line in a depth direction (a direction orthogonal to both a left-right direction and an up-down direction) in FIG. 3. The first irradiation parts 27a, 27b include surface-mounted infrared light LEDs; however the first irradiation parts 27a, 27b may include infrared light LEDs having other shapes such as shell-type LEDs. The first irradiation parts 27a, 27b are used for clearly imaging characters of the passport data 12 on the surface to be read of FIG. 2, for example. The infrared LEDs used in this embodiment have a half-angle of about 50 degree. As used herein, the "half-angle" refers to an angle at which the light intensity falls to one-half of the light intensity in the front direction.

The second irradiation parts 28a, 28b include a substrate and multiple visible light sources mounted on the substrate. The visible light sources emit a visible light. A circuit for driving the visible light sources is disposed on the substrate. The second irradiation parts 28a, 28b each include four white light LEDs as the visible light sources. The four white light LEDs are arranged in a line in the depth direction (a direction orthogonal to both the left-right direction and the up-down direction) in FIG. 3. The second irradiation parts 28a, 28b include surface-mounted white light LEDs; however the second irradiation parts 28a, 28b may include infrared light LEDs having other shapes such as a shell-type LEDs. The white light LEDs used in this embodiment have a half-angle of about 120 degree.

The imaging device 26 images the surface to be read of the reading object 10 placed on the upper surface of the reading window member 22, via the reading window member 22. The imaging device 26 is made up of an imaging sensor, a wide-angle lens, a circuit driving the imaging sensor, etc. Since the imaging device 26 includes the wide-angle lens, the imaging device 26 can be disposed such that the entire surface to be read falls within the angle of view without increasing a distance between the reading window member 22 and the imaging device 26. Therefore, the reading device 20 does not need to include a mirror bending an optical path from the surface to be read and focusing light on the imaging device. Thus, the reading device 20 can acquire an image with less illumination unevenness caused by the visible light sources.

The third irradiation part 29 includes a substrate and multiple ultraviolet light sources mounted on the substrate. The ultraviolet light sources emit an ultraviolet light. A circuit for driving the multiple ultraviolet light sources is disposed on the substrate. The ultraviolet light sources emit an ultraviolet light having a wavelength of about 10 to 400 nm. The third irradiation part 29 includes eight ultraviolet light LEDs as the ultraviolet light sources. The third irradiation part 29 includes a shell-type ultraviolet LEDs; however the third irradiation part 29 may include LEDs having other shapes such as surface-mounted LEDs. The ultraviolet LEDs used in this embodiment have a half-angle of about 15 degree. The third irradiation part 29 is used for causing the FIG. 13 for forgery prevention of FIG. 2 to fluoresce, for example.

In FIG. 3, the reading window member 22 is fitted into the opening in the upper portion of the housing 21. The imaging device 26 is disposed on a bottom portion (on the side of a second surface facing the first surface) inside the housing 21 under the reading window member 22 such that the entire reading window member 22 falls within the angle of view.

The reflection plate 23a is disposed on a left side wall (first side wall) connecting the first surface and the second surface inside the housing 21 below the reading window member 22. The first diffusion plate 24a is disposed on the left side wall inside the housing 21 and is inclined upward. The second diffusion plate 25a is disposed above the light-transmitting first diffusion plate 24a and is inclined downward relative to the left side wall inside the housing 21. The first diffusion plate 24a is inclined at an angle of $\theta_1$ relative to the normal line of the left side wall inside the housing 21. The second diffusion plate 25a is inclined at an angle of $\theta_2$ relative to the normal line of the left side wall inside the housing 21. For example, $\theta_1$ is 30 degree, and $\theta_2$ is 50 degree.

The second irradiation part 28a is disposed on the left side wall inside the housing 21 below the reflection plate 23a. The first irradiation part 27a is disposed on the bottom portion of the housing 21 to face the first diffusion plate 24a.

The reflection plate 23b is disposed on a right side wall (second side wall) connecting the first surface and the second surface inside the housing 21, symmetrically to the reflection plate 23a about an optical axis of the imaging device 26. The third diffusion plate 24b is disposed on the right side wall inside the housing 21 and is inclined upward. The fourth diffusion plate 25b is disposed above the third diffusion plate 24b and is inclined downward relative to the right side wall inside the housing 21. The third diffusion plate 24b is inclined upward at an angle of $\theta_3$ relative to the normal line of the right side wall inside the housing 21. The fourth diffusion plate 25b is inclined downward at an angle of $\theta_4$ relative to the normal line of the right side wall inside the housing 21. For example, $\theta_3$ is 30 degree, and $\theta_4$ is 50 degree.

The second irradiation part 28b is disposed on the right side wall inside the housing 21 symmetrically to the second irradiation part 28a about the optical axis of the imaging device 26. The first irradiation part 27b is disposed on the bottom portion of the housing 21 to face the third diffusion plate 24b, symmetrically to the first irradiation part 27a about the optical axis of the imaging device 26.

The third irradiation part 29 is disposed on a far side wall inside the housing 21 on the upper side (first surface side) of the first diffusion part and the second diffusion part.

2. Operation

The operation of the reading device 20 having the above configuration will be described. The surface to be read of the reading object 10 is placed on the upper surface of the reading window member 22. The reading device 20 irradiates the surface to be read of the reading object 10 with infrared light, visible light, and ultraviolet light and captures an image of the surface to be read to acquire the image. The reading device 20 further includes a communication part (not shown) and transmits the captured image to an external device connected via the communication part. The external device receives the captured image and uses the image for various analyses.

Specifically, the first irradiation parts 27a, 27b emit an infrared light. The second irradiation parts 28a, 28b emit a visible light. The infrared light from the first irradiation parts 27a, 27b and the visible light from the second irradiation parts 28a, 28b are diffused by the first diffusion part, the second diffusion part, and the reflection plates 23a, 23b. The surface to be read of the reading object 10 is illuminated by the diffused infrared light or visible light. The imaging device 26 captures an image of the surface to be read of the reading object 10 to acquire the image. The communication part transmits the acquired image to an external device.

The third irradiation part 29 emits an ultraviolet light. The ultraviolet light is directly applied to the surface to be read of the reading object 10 without being diffused by the first diffusion part, the second diffusion part, and the reflecting plates 23a, 23b. The directly applied ultraviolet light causes the FIG. 13 for forgery prevention disposed on the surface to be read of the reading object 10 to fluoresce. The imaging device 26 captures an image of the surface to be read of the reading object 10 to acquire the image. The communication part transmits the acquired image to an external device.

3. Diffusion of Light

Figure 4:
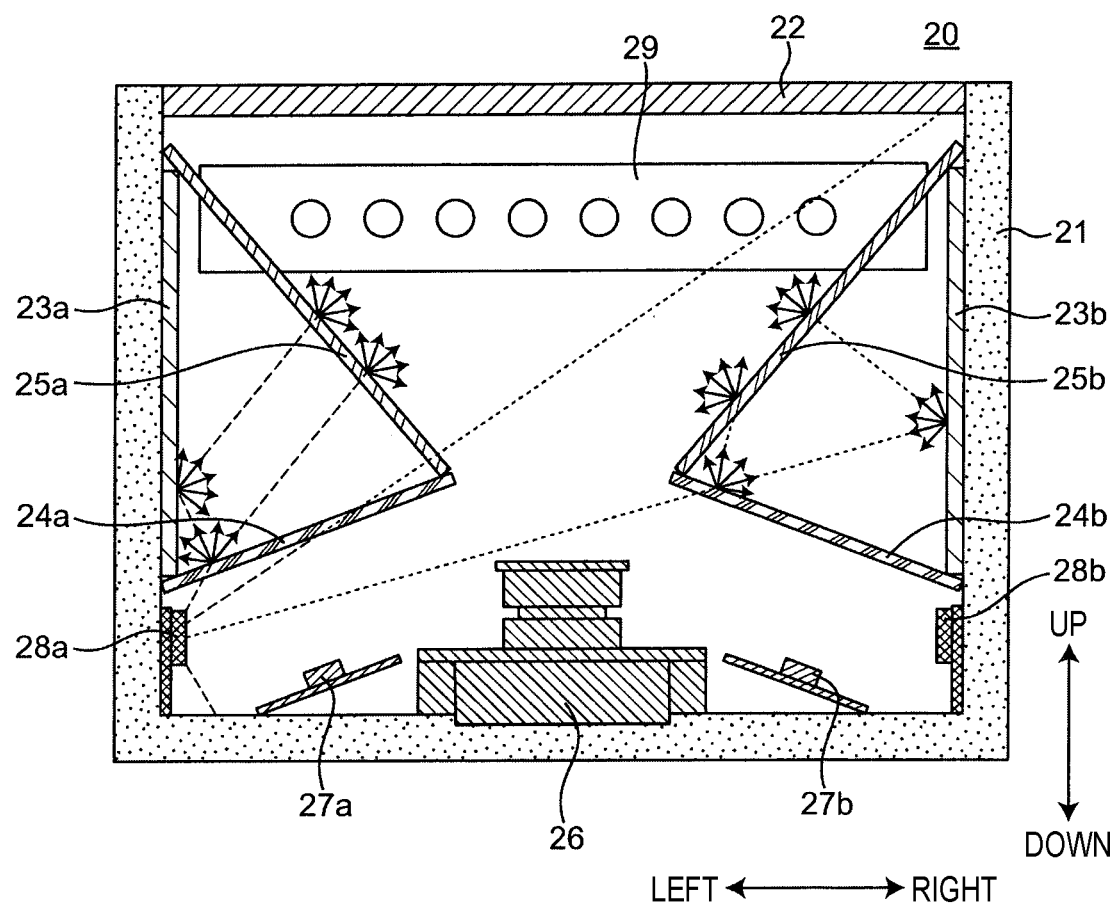
FIG. 4 is a view showing how visible light diffuses inside the reading device.

FIG. 4 is a view showing how the visible light from the second irradiation part 28a is diffused inside the reading device 20. A portion of the visible light from the second irradiation part 28a enters the first diffusion plate 24a. The first diffusion plate 24a transmits and diffuses the visible light entering from the second irradiation part 28a.

A portion of the visible light diffused by the first diffusion plate 24a enters the reflection plate 23a. The reflection plate 23a diffusely reflects the visible light entering from the first diffusion plate 24a. A portion of the visible light diffusely reflected from the reflection plate 23a enters the second diffusion plate 25a. The second diffusion plate 25a transmits and diffuses the visible light entering from the reflection plate 23a. A portion of the visible light transmitted and diffused from the second diffusion plate 25a is transmitted through the reading window member 22. The surface to be read of the reading object 10 placed on the reading window member 22 is illuminated by the visible light transmitted through the reading window member 22.

Another portion of the visible light diffused from the first diffusion plate 24a enters the second diffusion plate 25a. The second diffusion plate 25a transmits and diffuses the visible light entering from the first diffusion plate 24a. A portion of the visible light transmitted and diffused from the second diffusion plate 25a is transmitted through the reading window member 22. The surface to be read of the reading object 10 placed on the reading window member 22 is illuminated by the visible light transmitted through the reading window member 22.

Yet another portion of the visible light diffused from the second irradiation part 28a enters the third diffusion plate 24b. The third diffusion plate 24b transmits and diffuses the visible light entering from the second irradiation part 28a.

A portion of the visible light diffused from the third diffusion plate 24b enters the reflection plate 23b. The reflection plate 23b diffusely reflects the visible light entering from the third diffusion plate 24b. A portion of the visible light diffusely reflected from the reflection plate 23b enters the fourth diffusion plate 25b. The fourth diffusion plate 25b transmits and diffuses the visible light entering from the reflection plate 23b. A portion of the visible light transmitted and diffused from the fourth diffusion plate 25b is transmitted through the reading window member 22. The surface to be read of the reading object 10 placed on the reading window member 22 is illuminated by the visible light transmitted through the reading window member 22.

Another portion of the visible light diffused from the third diffusion plate 24b enters the fourth diffusion plate 25b. The fourth diffusion plate 25b transmits and diffuses the visible light entering from the third diffusion plate 24b. A portion of the visible light transmitted and diffused from the fourth diffusion plate 25b is transmitted through the reading window member 22. The surface to be read of the reading object 10 placed on the reading window member 22 is illuminated by the visible light transmitted through the reading window member 22.

The visible light from the second irradiation part 28b is diffused in a direction symmetrical to the visible light from the second irradiation part 28a described above about the optical axis of the imaging device 26 and illuminates the surface to be read.

In this embodiment, the half-angle of the white light LEDs used as the visible light sources is about 120 degree. The first diffusion plate 24a and the third diffusion plate 24b are arranged to prevent the visible light from the visible light from reaching the surface to be read over an angular range of the half-angle of the white light LEDs. Therefore, the surface to be read is not directly illuminated by the visible light having a high light intensity. Thus, the reading device 20 of this embodiment can acquire an image with less illumination unevenness caused by the visible light sources.

In this embodiment, the reading device 20 has gaps between the imaging device 26 and an upper edge of the first diffusion plate 24a and between the imaging device 26 and an upper edge of the third diffusion plate 24b. Since a portion of the visible light from the second irradiation parts 28a, 28b passes through the gaps, the reading device 20 can acquire an image with less illumination unevenness caused by the visible light sources. Additionally, the first diffusion plate 24a and the third diffusion plate 24b have a size not coming into the field of view of the imaging device 26, and the second diffusion plate 25a and the fourth diffusion plate 25b are inclined so as not to come into the field of view of the imaging device 26.

Figure 5:
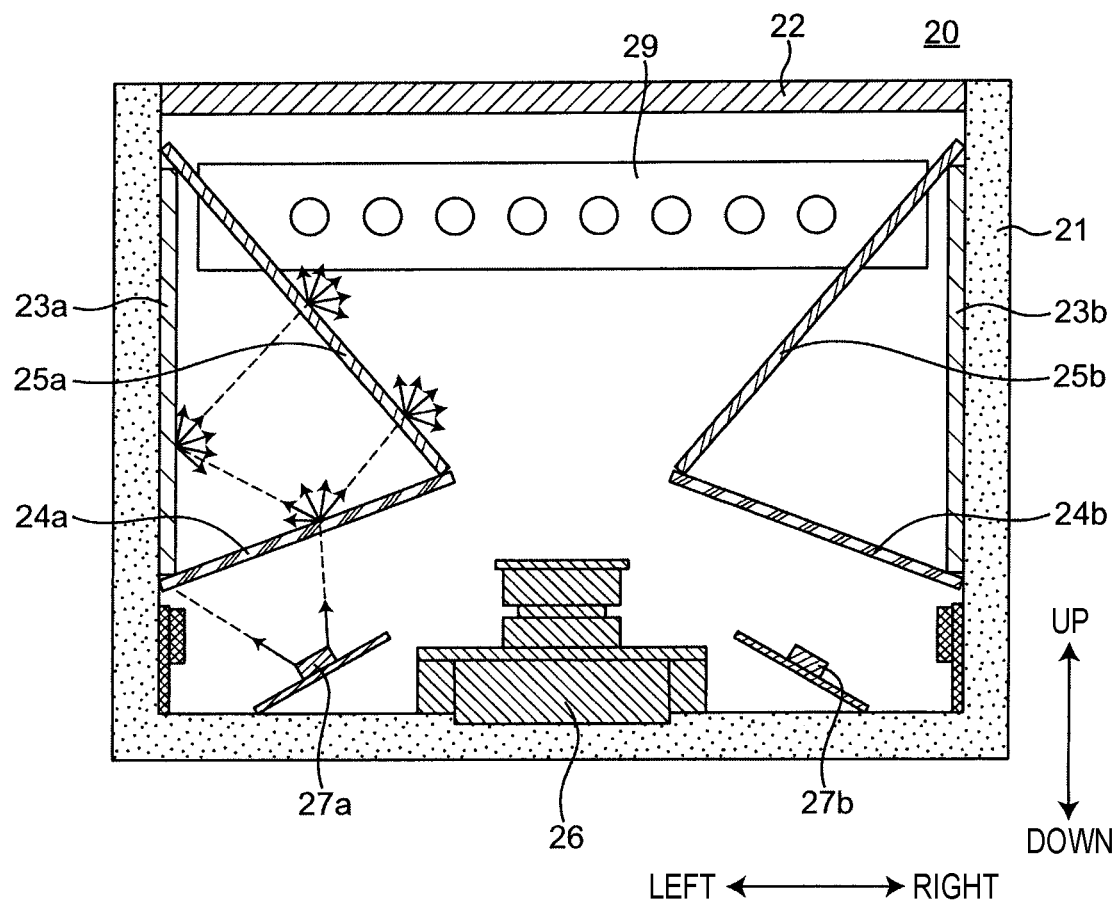
FIG. 5 is a view showing how infrared light diffuses inside the reading device.

FIG. 5 is a view showing how the infrared light from the first irradiation part 27a is diffused inside the reading device. A portion of the infrared light from the first irradiation part 27a enters the first diffusion plate 24a. The first diffusion plate 24a transmits and diffuses the infrared light entering from the first irradiation part 27a.

A portion of the infrared light diffused from the first diffusion plate 24a enters the reflection plate 23a. The reflection plate 23a diffusely reflects the infrared light entering from the first diffusion plate 24a. A portion of the infrared light diffused from the reflection plate 23a enters the second diffusion plate 25a. The second diffusion plate 25a transmits and diffuses the infrared light entering from the reflection plate 23a. A portion of the infrared light diffused from the second diffusion plate 25a is transmitted through the reading window member 22. The surface to be read of the reading object 10 placed on the reading window member 22 is illuminated by the infrared light transmitted through the reading window member 22.

Another portion of the infrared light diffused from the first diffusion plate 24a enters the second diffusion plate 25a. The second diffusion plate 25a transmits and diffuses the infrared light entering from the first diffusion plate 24a. A portion of the infrared light diffused from the second diffusion plate 25a is transmitted through the reading window member 22. The surface to be read of the reading object 10 placed on the reading window member 22 is illuminated by the infrared light transmitted through the reading window member 22.

The infrared light from the first irradiation part 27b is diffused in a direction symmetrical to the infrared light from the first irradiation part 27a described above about the optical axis of the imaging device 26 and illuminates the surface to be read.

In this embodiment, the half-angle of the infrared LEDs used as the infrared light sources is about 50 degree. The first diffusion plate 24a and the third diffusion plate 24b are arranged to prevent the infrared light from the infrared light sources from reaching the surface to be read over an angular range of the half-angle of the infrared light LEDs. Therefore, the surface to be read is not illuminated by the infrared light having a high light intensity. Thus, the reading device 20 of this embodiment can acquire an image with less illumination unevenness caused by the infrared light sources.

The ultraviolet light from the third irradiation part 29 is transmitted through the reading window member 22 without passing through the first diffusion part, the second diffusion part, and the reflection plates 23a, 23b. The ultraviolet light transmitted through the reading window member 22 causes the FIG. 13 for forgery prevention of FIG. 2 to fluoresce, for example.

The reading device 20 of this embodiment allows the ultraviolet light from the third irradiation part 29 to reach the surface to be read without passing through the first diffusion part, the second diffusion part, and the reflection plates 23a, 23b. As a result, the first diffusion part, the second diffusion part, and the reflecting plates 23a, 23b can be made of a resin material that may be deteriorated by ultraviolet rays or a resin material absorbing ultraviolet rays.

4. Summary

As described above, the reading device 20 includes the housing 21, the first irradiation part 27a, the imaging device 26, and the first diffusion part. The housing 21 has an opening in the upper portion (first surface) with the transparent reading window member 22 disposed therein. The first irradiation part 27a emits an infrared light. The imaging device 26 is disposed on the bottom portion (second surface) facing the upper portion inside the housing such that the optical axis is directed to the reading window member 22. The first diffusion part is disposed on the left side wall (first side wall) connecting the upper portion and the bottom portion inside the housing 21. The first diffusion part diffuses the infrared light from the first irradiation part 27a. The first diffusion part is made up of the light-transmitting first diffusion plate 24a and the light-transmitting second diffusion plate 25a. The first diffusion plate 24a is disposed on the bottom portion side of the left side wall and inclined toward the upper portion. The second diffusion plate 25a is disposed on the upper portion side of the left side wall and inclined toward the bottom portion.

The first irradiation part 27a is disposed between the first diffusion plate 24a and the bottom portion of the housing 21.

As a result, the infrared light from the first irradiation part 27a is diffused through the first diffusion part and applied to the reading window member 22, so that the reading device 20 can acquire an image with less illumination unevenness caused by the first irradiation part 27a.

The reading device 20 further includes the light-diffusing reflection plate 23a. The reflection plate 23a is attached to the left side wall of the housing 21.

As a result, the reflection plate 23a diffusely reflects the light from the first diffusion part, so that the reading device 20 can efficiently use the light.

The reading device 20 further includes the second irradiation part 28a emitting a visible light. The second irradiation part 28a is disposed between the first diffusion plate 24a and the bottom portion of the housing 21. The visible light from the second irradiation part 28a is diffused by the first diffusion part.

As a result, the visible light from the second irradiation part 28a is diffused through the first diffusion part and applied to the reading window member 22, so that the reading device 20 can acquire an image with less illumination unevenness caused by the second irradiation part 28a.

The reading device 20 further includes the third irradiation part 29 emitting an ultraviolet light. The third irradiation part 29 is disposed between the upper portion of the housing 21 and the first diffusion part.

As a result, the ultraviolet light from the third irradiation part 29 reaches the surface to be read without passing through the first diffusion part and the reflection plate 23a. Therefore, the first diffusion part, the second diffusion part, and the reflecting plates 23a, 23b can be made of a resin material that may be deteriorated by ultraviolet rays or a resin material absorbing ultraviolet rays.

The imaging device 26 is disposed such that the entire reading window member 22 is included in a range of an angle of view. In this regard, the imaging device 26 may include a wide-angle lens.

As a result, the imaging device 26 can be disposed such that the entire surface to be read falls within the angle of view without increasing the distance between the reading window member 22 and the imaging device 26, so that the reading device 20 does not need to include a mirror bending an optical path from the surface to be read and focusing light on the imaging device as in the conventional reading device. Therefore, the present disclosure can provide a small-sized reading device.

The reading device 20 has a gap between the upper edge of the first diffusion plate 24a and the imaging device 26.

As a result, a portion of the visible light from the second irradiation parts 28a, 28b passes through the gap, so that the reading device 20 can acquire an image with less illumination unevenness caused by the visible light sources.

The first diffusion plate 24a is disposed such that the infrared light from the first irradiation part 27a is prevented from directly reaching the reading window member 22 over the angular range of the half-angle of the first irradiation part.

As a result, the surface to be read is not directly illuminated by the infrared light having a high light intensity. Therefore, the reading device 20 can acquire an image with less illumination unevenness caused by the infrared light source.

The first diffusion plate 24a is disposed such that the visible light from the second irradiation part 28a is prevented from directly reaching the reading window member 22 over the angular range of the half-angle of the second irradiation part.

As a result, the surface to be read is not directly illuminated by the visible light having a high light intensity. Therefore, the reading device 20 can acquire an image with less illumination unevenness caused by the visible light sources.

The reading device 20 further includes the second diffusion part. The second diffusion part is disposed on the right side wall (second side wall) facing the left side wall inside the housing 21. The second diffusion part diffuses the infrared light from the first irradiation part 27b. The second diffusion part is made up of the light-transmitting third diffusion plate 24b and the light-transmitting fourth diffusion plate 25b. The third diffusion plate 24b is disposed on the bottom portion side of the right side wall and inclined toward the upper portion. The fourth diffusion plate 25b is disposed on the upper portion side of the right side wall and inclined toward the bottom portion.

The reading device 20 further includes the light-diffusing reflection plate 23b. The reflection plate 23b is attached to the right side wall of the housing 21.

As a result, the reflection plate 23b diffusely reflects the light from the second diffusion part, so that the reading device 20 can efficiently use the light.

The first irradiation part 27b is disposed between the first diffusion plate 24a and the bottom portion of the housing 21.

As a result, the infrared light from the first irradiation part 27b is diffused through the first diffusion part and applied to the reading window member 22, so that the reading device 20 can acquire an image with less illumination unevenness caused by the first irradiation part 27b.

The reading device 20 further includes the second irradiation part 28b emitting a visible light. The second irradiation part 28b is disposed between the first diffusion plate 24a and the bottom portion of the housing 21.

As a result, the visible light from the second irradiation part 28b is diffused through the second diffusion part and applied to the reading window member 22, so that the reading device 20 can acquire an image with less illumination unevenness caused by the second irradiation part 28b.

The first diffusion plate 24a has a size not coming into the field of view of the imaging device 26, and the second diffusion plate 25a is inclined so as not to come into the field of view of the imaging device 26.

Second Embodiment

In this embodiment, some configurations of a reading device having a configuration different from the first embodiment will be described. FIGS. 6A, 6B, 7A, 7B, and 8 are cross-sectional views showing other embodiments of the reading device.

Figure 6A:
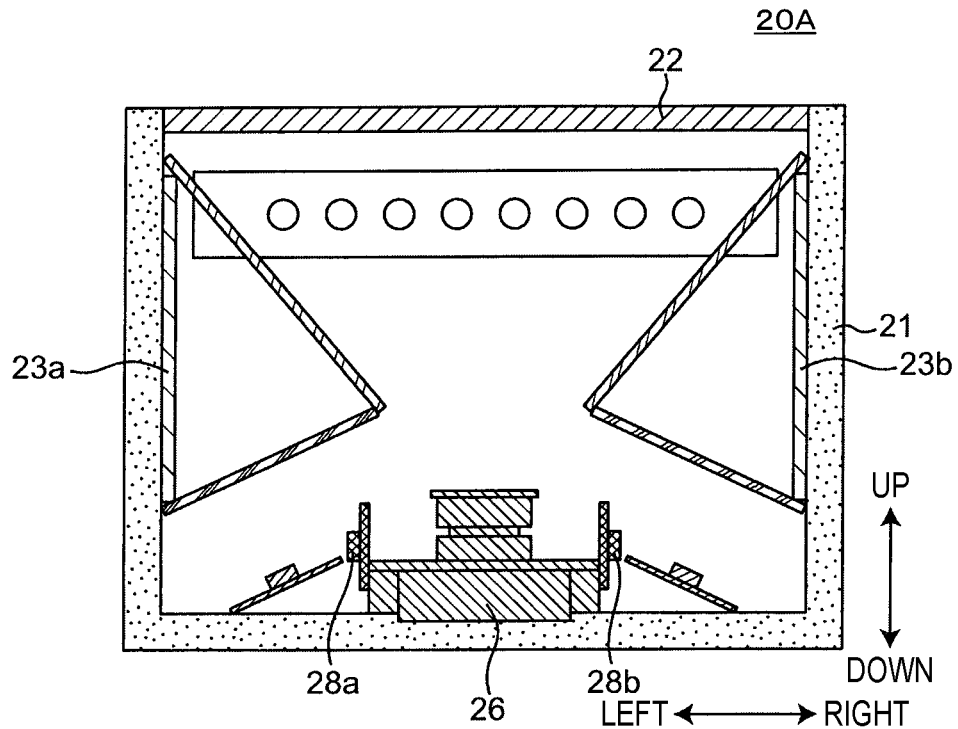
FIG. 6A is a cross-sectional view showing another embodiment of the reading device.

A reading device 20A of FIG. 6A is different from that of the first embodiment of FIG. 3 in the arrangement of the second irradiation parts 28a, 28b emitting a visible light. In the reading device 20 of the first embodiment, as shown in FIG. 3, the second irradiation part 28a is disposed on the left side wall inside the housing 21 below the light-diffusing reflection plate 23a. On the other hand, the second irradiation part 28a of the reading device 20A of FIG. 6A is disposed on the left side surface of the imaging device 26 such that the optical axis of the second irradiation part 28a is orthogonal to the left side wall inside the housing 21. Similarly, the second irradiation part 28b of the reading device 20A is disposed symmetrically to the second irradiation part 28a on the right side of the imaging device 26 such that the optical axis of the second irradiation part 28b is orthogonal to the right side wall inside the housing 21.

Figure 6B:
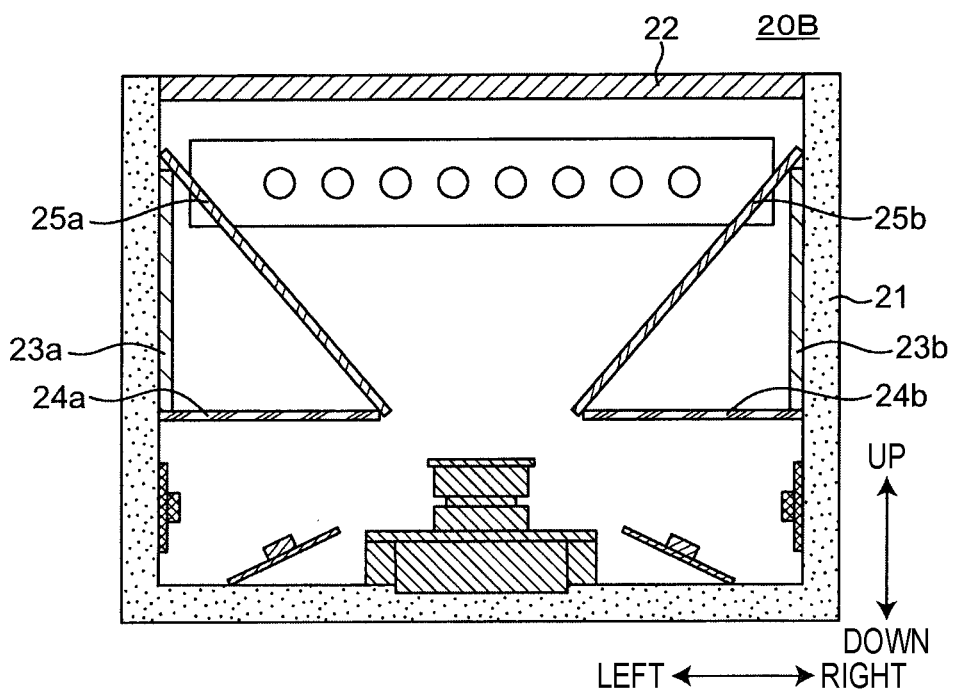
FIG. 6B is a cross-sectional view showing another embodiment of the reading device.

A reading device 20B of FIG. 6B is different from the first embodiment of FIG. 3 in the arrangement of the light-transmitting first diffusion plate 24a. In the reading device 20 of the first embodiment, as shown in FIG. 3, the first diffusion plate 24a is disposed on the left side wall inside the housing 21 and is inclined upward. On the other hand, the first diffusion plate 24a of FIG. 6B is disposed orthogonally to the left side wall inside the housing 21. The third diffusion plate 24b is disposed symmetrically to the first diffusion plate 24a and orthogonally to the right side wall inside the housing 21.

Figure 7A:
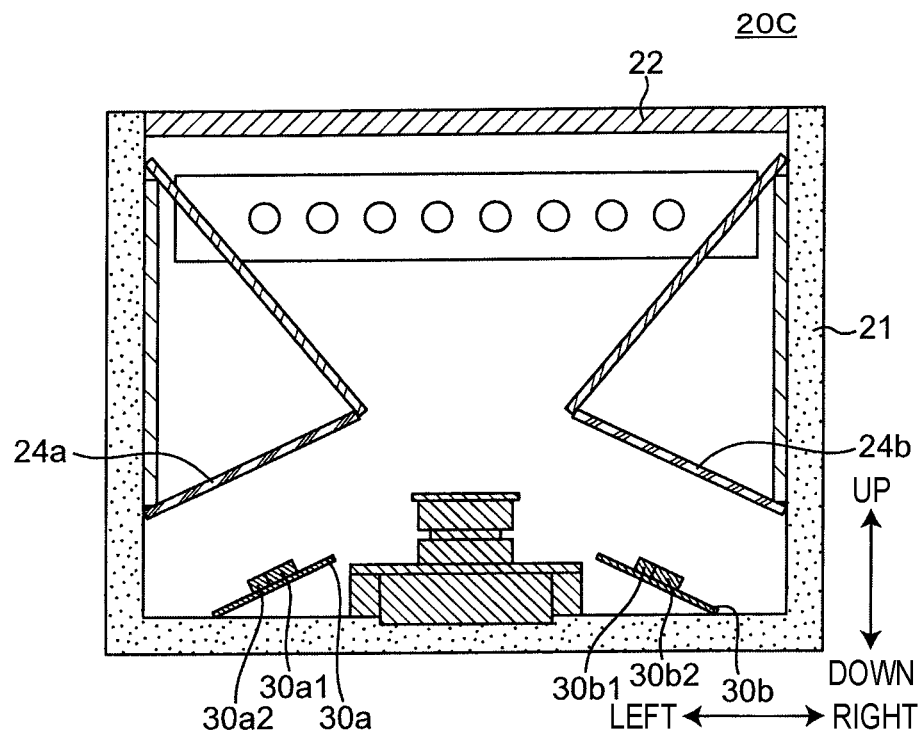
FIG. 7A is a cross-sectional view showing another embodiment of the reading device.

A reading device 20C of FIG. 7A includes a fourth irradiation part 30a instead of the first irradiation part 27a and the second irradiation part 28a in the configuration of the first embodiment (FIG. 3). The reading device 20C further includes a fourth irradiation part 30b instead of the first irradiation part 27b and the second irradiation part 28b in the configuration of FIG. 3.

Each of the fourth irradiation parts 30a, 30b includes a substrate and multiple infrared light sources and visible light sources mounted on the substrate. The fourth irradiation part 30a includes four white light LEDs 30a1 as visible light sources and six infrared light LEDs 30a2 as infrared light sources. The fourth irradiation part 30b includes four white light LEDs 30b1 as visible light sources and six infrared light LEDs 30b2 as infrared light sources.

In the fourth irradiation part 30a, the six infrared light LEDs 30a2 are arranged in a line on the substrate. The four white light LEDs 30a1 are arranged in a line on the substrate adjacently to the line of the infrared light LEDs 30a2. The fourth irradiation part 30b has the same configuration as the fourth irradiation part 30a.

In the reading device 20C, the fourth irradiation part 30a is disposed at a tilt on the bottom surface of the housing 21 such that that the optical axis thereof is orthogonal to a principal surface of the first diffusion plate 24a. Similarly, the fourth irradiation part 30b is also disposed at a tilt on the bottom surface of the housing 21 such that the optical axis thereof is orthogonal to a principal surface of the third diffusion plate 24b.

Figure 7B:
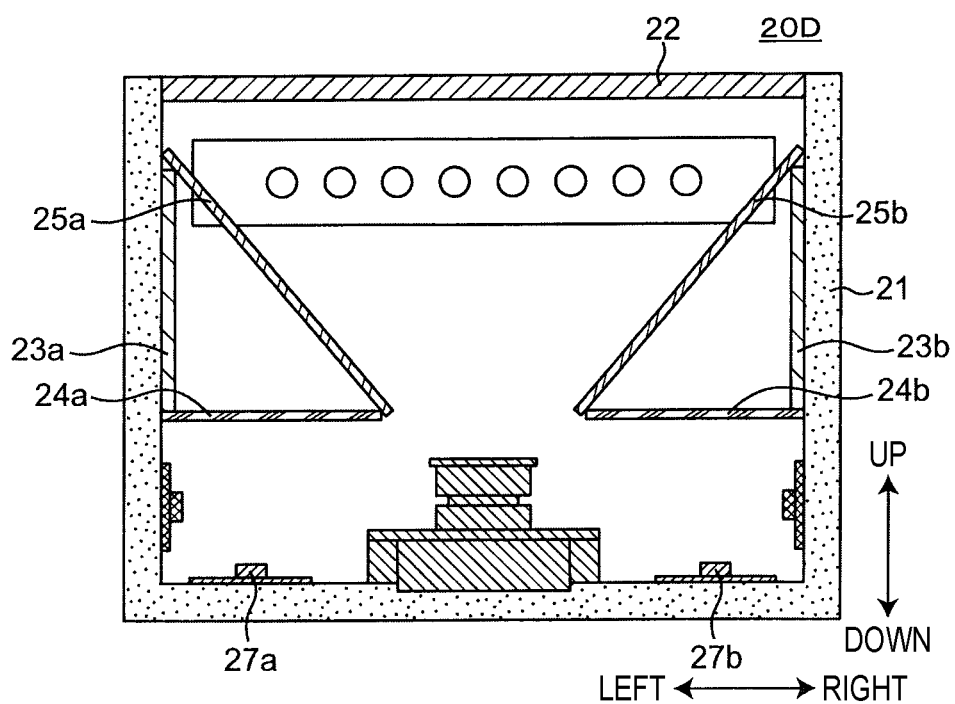
FIG. 7B is a cross-sectional view showing another embodiment of the reading device.

In FIG. 7B, the first diffusion plate 24a is disposed orthogonally to the left side wall inside the housing 21. The third diffusion plate 24b is also disposed orthogonally to the right side wall inside the housing 21.

The first irradiation part 27a is disposed on the bottom portion of the housing 21 below the first diffusion plate 24a such that the optical axis thereof is orthogonal to a principal surface of the first diffusion plate 24a. Similarly, the first irradiation part 27b is disposed on the bottom portion of the housing 21 below the third diffusion plate 24b such that the optical axis thereof is orthogonal to a principal surface of the third diffusion plate 24b.

Figure 8:
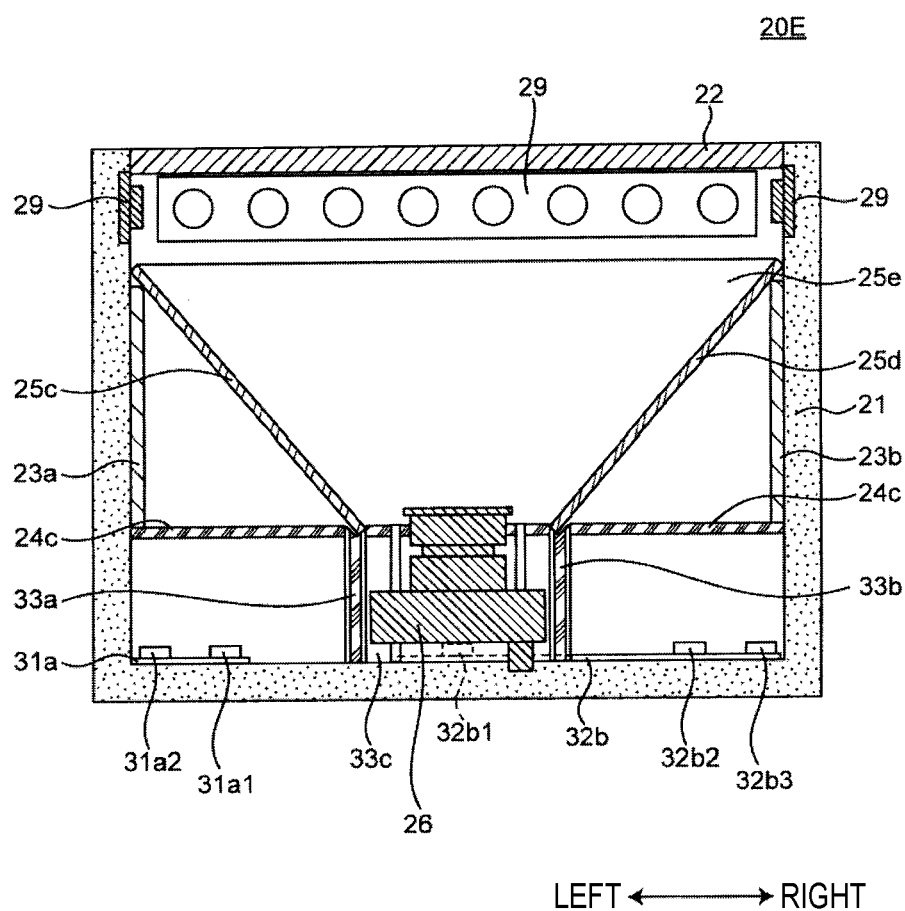
FIG. 8 is a cross-sectional view showing another embodiment of the reading device.

A reading device 20E of FIG. 8 is different from the first embodiment (FIG. 3) in the configuration of the irradiation parts and the diffusion parts. The reading device 20 of FIG. 3 includes the third irradiation part 29 emitting an ultraviolet light on the far side wall inside the housing 21. On the other hand, the reading device 20E includes the third irradiation part 29 also on the left and right side walls and a near side wall inside the housing 21. The reading device 20 of FIG. 3 includes the third irradiation part 29 emitting an ultraviolet light on the left and right side walls inside the housing 21. On the other hand, the reading device 20E includes the third irradiation part 29 also on the left and right side walls and the near side wall inside the housing 21.

Figure 9:
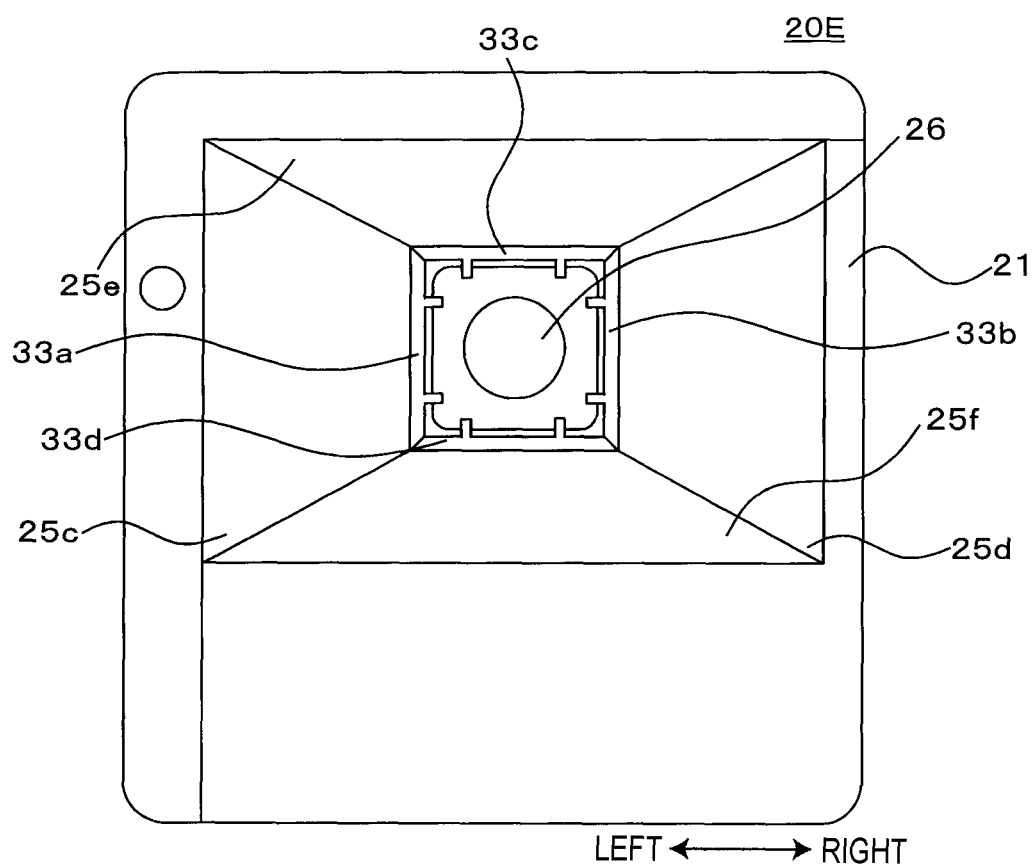
FIG. 9 is a view for explaining another embodiment of the reading device.
Figure 10:
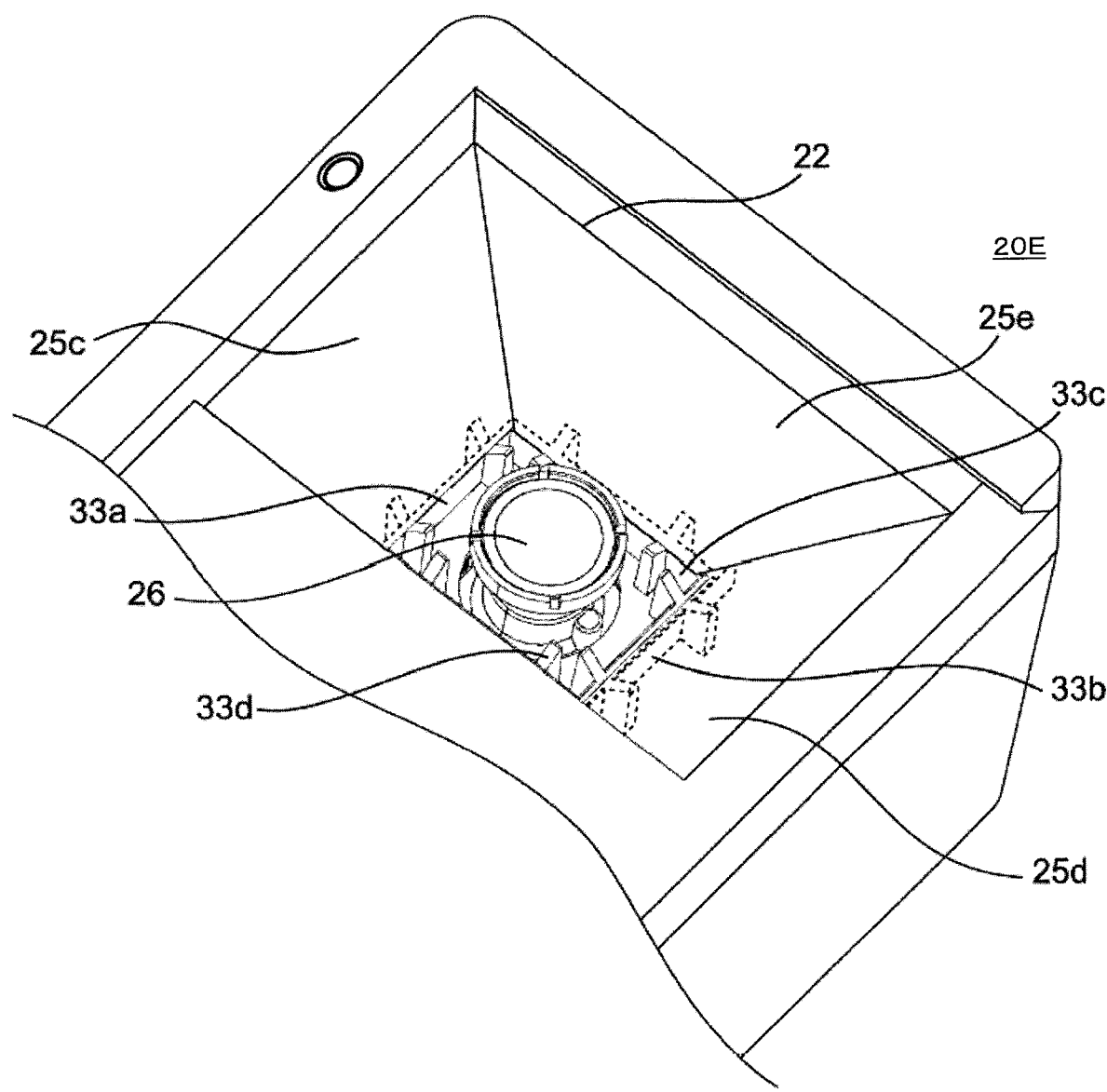
FIG. 10 is a view for explaining another embodiment of the reading device.

FIGS. 9 and 10 are views for explaining the reading device 20E of FIG. 8. FIG. 9 is a top view of the reading device 20E with the reading window member 22 and the third irradiation part 29 of FIG. 8 removed. The reading device 20E includes four transmissive diffusion plates 25c to 25f as shown in FIG. 9 instead of the second diffusion plate 25a and the fourth diffusion plate 25b in the configuration of the first embodiment (FIG. 3). As shown in FIGS. 9 and 10, the reading device 20E further includes four ribs 33a to 33d vertically disposed on the bottom portion of the housing 21 and arranged to surround the side portions of the imaging device 26. The diffusion plates 25c to 25f are respectively supported by the ribs 33a to 33d and the walls inside the housing 21.

The reading device 20E includes a transmissive diffusion plate 24c instead of the first diffusion plate 24a and the third diffusion plate 24b in the configuration of FIG. 3. As shown in FIG. 8, the diffusion plate 24c is disposed between the ribs 33a to 33d and the walls inside the housing 21.

Figure 11:
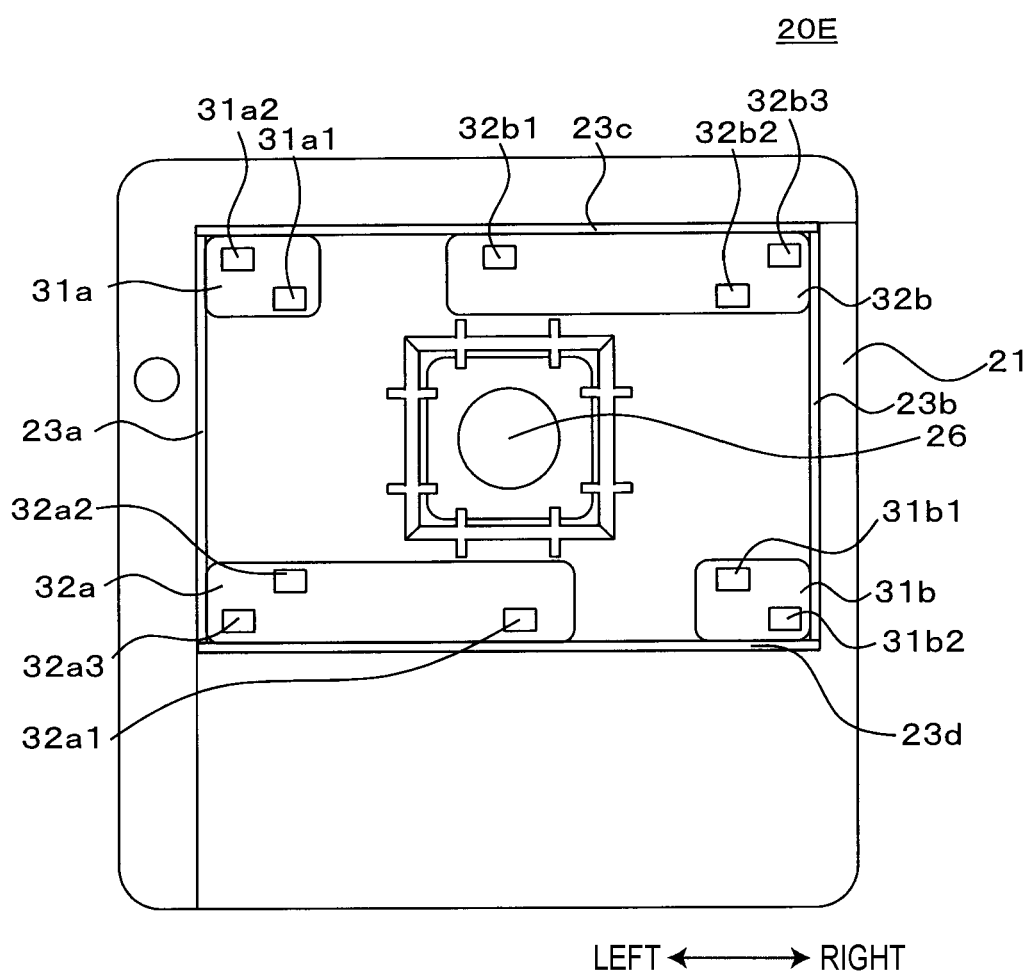
FIG. 11 is a view for explaining another embodiment of the reading device.

FIG. 11 is a top view of the reading device 20E with the diffusion plates 25c to 25f and the diffusion plate 24c removed in FIGS. 8 and 9. The reading device 20 of the first embodiment (FIG. 3) includes light-diffusing reflection plates 23a, 23b on the left and right side walls inside the housing 21. On the other hand, the reading device 20E also includes light-diffusing reflection plates 23c, 23d on the far and near side walls inside the housing 21.

The reading device 20E includes irradiation parts 31a, 31b, 32a, 32b of FIG. 11 instead of the first irradiation parts 27a, 27b and the second irradiation parts 28a, 28b in the configuration of the first embodiment (FIG. 3). The irradiation parts 31a, 31b, 32a, 32b each include a substrate and visible and infrared light sources mounted on the substrate.

The irradiation parts 31a, 32b are arranged close to the far side wall inside the housing 21. The irradiation part 31a includes one white light LED 31a1 as the visible light source and one infrared light LED 31a2 as the infrared light source. On the substrate of the irradiation part 31a, the white light LED 31a1 is disposed at the corner closest to the imaging device 26, and the infrared light LED 31a2 is disposed at the corner farthest from the imaging device 26.

The irradiation part 32b includes two infrared light LEDs 32b1, 32b3 as the infrared light sources and one white light LED 32b2 as the visible light source. On the substrate of the irradiation part 32b, the infrared light LED 32b1 is disposed close to the center in the left-right direction of the far side wall inside the housing 21, and the white light LED 32b2 and the infrared light LED 32b3 are respectively arranged symmetrically to the white light LEDs 31a1 and the infrared light LEDs 31a2 of the irradiation part 31a.

The irradiation parts 31b, 32a are arranged close to the near side wall inside the housing 21. The irradiation part 31b includes one white light LED 31b1 as the visible light source and one infrared light LED 31b2 as the infrared light source. The irradiation part 31b is disposed symmetrically to the irradiation part 31a with respect to the optical axis of the imaging device 26. The irradiation part 32a includes two infrared light LEDs 32a1, 32a3 as the infrared light sources and one white light LED 32a2 as the visible light source. The irradiation part 32a is disposed symmetrically to the irradiation part 32b with respect to the optical axis of the imaging device 26.

In the configuration described above, the reading device 20E can include the diffusion plates 25c to 25f symmetrically in four directions, so that an image with less illumination unevenness caused by the irradiation parts 31a, 31b, 32a, 32b can be acquired.

OTHER EMBODIMENTS

As described above, the embodiments have been described as exemplification of the techniques disclosed in this application. However, the techniques in the present disclosure are not limited thereto and are also applicable to embodiments in which modifications, replacements, additions, omissions, etc. are appropriately made. Additionally, the constituent elements described in the embodiments can be combined to provide a new embodiment.

In the first embodiment, the reading device 20 includes the point light sources as the visible light sources, the infrared light sources, and the ultraviolet light sources; however, the present invention is not necessarily limited thereto. For example, a line light source or a surface light source made of an organic EL material may be used.

In the first embodiment, the first irradiation parts 27a, 27b each include six infrared light LEDs as the infrared light sources; however, the number of the included infrared light LEDs may be different.

In the first embodiment, the second irradiation parts 28a, 28b each include four white light LEDs as the visible light sources; however, the number of the included white light LEDs may be different.

In the first embodiment, the reading device 20 uses the white light LEDs as the visible light sources; however, LEDs other than the white light LEDs may be used.

In the first embodiment, the reading device 20 includes the visible light sources and the ultraviolet light sources; however, the reading device 20 may not include the visible light sources and/or the ultraviolet light sources.

In the first embodiment, the second irradiation parts 28a, 28b are respectively disposed on the side walls inside the housing 21; however, the present invention is not necessarily limited thereto. The second irradiation parts 28a, 28b may be disposed at other positions such that the first diffusion plate 24a and the third diffusion plate 24b prevent the visible light from the second irradiation parts 28a, 28b from reaching the reading window over the angular range of the half-angle of the second irradiation parts 28a, 28b.

In the first embodiment, the first irradiation parts 27a, 27b are disposed to face the first diffusion plate 24a and the third diffusion plate 24b, respectively; however, the present invention is not necessarily limited thereto. The first irradiation parts 27a, 27b may be disposed at other positions such that the first diffusion plate 24a and the third diffusion plate 24b prevent the infrared light from the first irradiation parts 27a, 27b from reaching the reading window over the angular range of the half-angle of the first irradiation parts 27a, 27b.

In the first embodiment, the first irradiation parts 27a, 27b, the second irradiation parts 28a, 28b, the first diffusion part (the first diffusion plate 24a, the second diffusion plate 25a), the second diffusion part (the third diffusion plate 24b, the fourth diffusion plate 25b), and the reflecting plates 23a, 23b are paired constituent elements symmetrical about the optical axis of the imaging device 26; however, the present invention is not necessarily limited thereto. The constituent elements such as the first irradiation part 27a, the second irradiation part 28a, the first diffusion part (the first diffusion plate 24a, the second diffusion plate 25a), and the reflection plate 23a may be included only on one side.

In the first embodiment, the optical axis of the imaging device 26 is in the vertical direction in the first embodiment; however, the present invention is not necessarily limited thereto. The optical axis of the imaging device 26 may be in a horizontal direction or an obliquely upward direction. The imaging device 26 is disposed on the bottom portion inside the housing 21 directly below the reading window member 22 such that the optical axis is directed to the reading window member 22. For example, the housing 21 has an opening on a side surface (first surface), and the reading window member 22 is disposed in the opening. The imaging device 26 may be disposed on a side surface (second surface) facing the side surface (first surface) inside the housing such that the optical axis is directed to the reading window member 22.

In the first embodiment, the first irradiation parts 27a, 27b include the substrate and the multiple infrared light sources mounted on the substrate, and the second irradiation parts 28a, 28b include the substrate and the multiple visible light sources mounted on the substrate, and the third irradiation part 29 includes the substrate and the multiple ultraviolet light sources mounted on the substrate; however, the present invention is not necessarily limited thereto. The first irradiation part may include only multiple infrared light sources, the second irradiation part may include only multiple visible light sources, and the third irradiation part may include only multiple ultraviolet light sources. In this case, the substrate (circuit) controlling the light sources may be disposed inside the housing 21.

In the reading device 20C of FIG. 7A, the fourth irradiation part 30a includes the six infrared light LEDs 30a2 as the infrared light sources; however, the number of the included infrared light LEDs 30a2 may be different. The fourth irradiation part 30b includes the six infrared light LEDs 30b2 as the infrared light sources; however, the number of the included infrared light LEDs 30b2 may be different.

In the reading device 20C of FIG. 7A, the fourth irradiation part 30a includes the four white light LEDs 30a1 as the white light sources; however, the number of the included white light LEDs 30a1 may be different. The fourth irradiation part 30b includes the four infrared light LEDs 30b1 as the infrared light sources; however, the number of the included infrared light LEDs 30b1 may be different.

In the first embodiment, the third irradiation part 29 is disposed between the upper portion of the housing 21 and the first diffusion part; however, the third irradiation part 29 may be disposed at a different position. For example, the third irradiation part 29 may be disposed between the first diffusion part and the bottom portion.

In the embodiment of the present disclosure, a passport has been described as an example of the reading object 10; however, the present invention is not limited thereto. The reading object 10 may be any of those readable by the imaging device 26 such as a license, a document, a photograph, and a form.

The embodiments have been described as exemplification of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Thus, even though these non-essential constituent elements are included in the accompanying drawings and the detailed description, these non-essential constituent elements should not immediately be recognized as being essential.

Since the embodiments described above are intended to illustrate the techniques in the present disclosure, various modifications, replacements, additions, omissions, etc. can be made within the claims and the scope equivalent thereto.

The invention claimed is:

1. A reading device comprising:
a housing including an opening on a first surface with a transparent reading window member disposed in the opening;
a first irradiation part emitting an infrared light;
an imaging device disposed on a second surface side facing the first surface inside the housing such that an optical axis is directed to the reading window member; and
a first diffusion part disposed on a first side wall connecting the first surface and the second surface inside the housing to diffuse the infrared light, wherein
the first diffusion part is made up of
a light-transmitting first diffusion plate disposed on the second surface side of the first side wall and inclined toward the first surface, and
a light-transmitting second diffusion plate disposed on the first surface side of the first side wall and inclined toward the second surface.

2. The reading device according to claim 1, wherein the first irradiation part is disposed between the first diffusion plate and the second surface.

3. The reading device according to claim 1, wherein a light-diffusing reflection plate is attached to the first side wall.

4. The reading device according to claim 1, wherein the second irradiation part emitting a visible light is disposed between the first diffusion part and the second surface, and wherein the first diffusion part diffuses the visible light.

5. The reading device according to claim 4, wherein the first diffusion plate is disposed such that the visible light from the second irradiation part is prevented from directly reaching the reading window member over an angular range of the half-angle of the second irradiation part.

6. The reading device according to claim 1, wherein a third irradiation part emitting an ultraviolet light is disposed between the first surface and the first diffusion part.

7. The reading device according to claim 1, wherein the imaging device is disposed such that the entire reading window member is included in a range of an angle of view.

8. The reading device according to claim 1, wherein the first diffusion plate is disposed such that the infrared light from the first irradiation part is prevented from directly reaching the reading window member over an angular range of the half-angle of the first irradiation part.

9. The reading device according to claim 1, further comprising a second diffusion part disposed on a second side wall facing the first side wall inside the housing and diffusing the infrared light, wherein
- the second diffusion part is made up of
  - a light-transmitting third diffusion plate disposed on the second surface side of the second side wall and inclined toward the first surface, and
  - a light-transmitting fourth diffusion plate disposed on the first surface side of the second side wall and inclined toward the second surface.

10. The reading device according to claim 1, wherein the first surface is an upper portion of the housing.

11. The reading device according to claim 1, wherein
- the first diffusion plate has a size not coming into the field of view of the imaging device, and wherein
- the second diffusion plate is inclined so as not to come into the field of view of the imaging device.

\* \* \* \* \*